United States Patent
Douglas et al.

(10) Patent No.: US 6,796,518 B2
(45) Date of Patent: Sep. 28, 2004

(54) MULTI-FUNCTION SHOWERHEAD FILTER SYSTEM

(76) Inventors: John H. Douglas, 14001 63rd Way, Clearwater, FL (US) 33760; William G. Cunningham, 14001 63rd Way, Clearwater, FL (US) 33760

( * ) Notice: Subject to any disclaimer, the term of this patent is extended or adjusted under 35 U.S.C. 154(b) by 172 days.

(21) Appl. No.: 10/253,687

(22) Filed: Sep. 25, 2002

(65) Prior Publication Data

US 2004/0056123 A1 Mar. 25, 2004

(51) Int. Cl.[7] ............................................. B05B 15/08
(52) U.S. Cl. ..................... 239/587.4; 239/462; 239/390; 239/436; 239/587.1
(58) Field of Search ............................. 239/587.4, 588, 239/587.1, 390, 391, 443, 440, 436, 462, 428.5; 4/615, 559; 210/449

(56) References Cited

U.S. PATENT DOCUMENTS

| | | |
|---|---|---|
| 3,018,969 A | 1/1962 | Gentry |
| 3,905,358 A * | 9/1975 | Jacuzzi ....................... 601/169 |
| 4,426,040 A * | 1/1984 | Smith ....................... 239/428.5 |
| 4,933,080 A | 6/1990 | Parise |
| 5,008,011 A | 4/1991 | Underwood |
| 5,111,994 A * | 5/1992 | Gonzalez ................. 239/428.5 |
| 5,152,464 A | 10/1992 | Rundzaitis |
| 5,300,224 A | 4/1994 | Farley |
| 5,545,314 A | 8/1996 | Farley |
| 6,325,930 B2 | 12/2001 | Gentry |

* cited by examiner

Primary Examiner—Dinh Q. Nguyen
(74) Attorney, Agent, or Firm—M. K. Silverman (57) ABSTRACT

A multi-function showerhead filter system includes a ball-like swivel-mounted inlet joint having a fluid input to the housing, the inlet joint including a fluid input cavity converging, at a distal end, into a venturi outlet. The system also includes a pressure chamber formed within the housing, downstream of the venturi outlet and in fluid communication with it, the chamber having an inlet at least equal to a largest radius of the venturi outlet. The system also includes a turbulence-inducing water filter cartridge secured within the housing downstream of the pressure chamber and having an inlet surface in fluid and mechanical communication with it. The system further includes an output within the housing, secured downstream of the filter cartridge and in fluid communication with it, the output of which is passed through the cartridge, into one of the function modes of spraying, bubbling and massaging.

6 Claims, 8 Drawing Sheets

MULTI-FUNCTION SHOWERHEAD FILTER SYSTEM

BACKGROUND OF THE INVENTION

1. Area of the Invention

The present invention relates to showerhead systems having an internal filtration system.

2. Prior Art

The recognition and linking of macroscopic and microscopic pathogens to the aesthetic and health qualities of water has resulted in a search for effective water disinfects and treatment procedures. The introduction of water chlorinization, as a continuous water disinfecting process, occurred early in the twentieth century. Today approximately 80% of all potable water systems in the United States use chlorine as a water disinfectant.

However, the treatment of water with chlorine has certain side effects. Even in lower concentrations, such as originally used by commercial food processors and bottlers, chlorine creates an objectionable odor and taste. Also, as chlorine is added to water containing pathogenic microorganisms, the highly reactive chlorine combines with fatty acids and carbon fragments to form a variety of toxic compounds.

Recent studies have indicated that chlorine and the compounds which chlorine forms in water can be inhaled and absorbed through the skin by persons bathing or showering. According to research findings presented at a meeting of the American Chemical Society in the 1980's, it was shown that the taking of long, hot showers is a health risk. In summary, this presentation stated that taking showers, and to a lesser extent, baths, leads to a greater exposure to toxic chemicals contaminated in the water than does drinking the water. Due to the increased temperatures and surface area, the chemicals that evaporate out of the hot water are absorbed through the skin. Moreover, the chlorine also escapes to the surrounding air and can be harmful to persons breathing the air around showers and bath, and thus increasing the chance of harmful exposure beyond that which such persons would encounter by actually drinking the water.

Accordingly, shower filter assemblies have been proposed in the past for filtering out chlorine and chlorine compounds from shower water. Such filter assemblies are described, for example, in U.S. Pat. Nos. 5,300,224; 5,008,011; 5,152,464; 4,933,080; 5,545,314 and 6,325,930. Such solutions have, however, not proven to be cost-effective, this typically due to the requirement of use of costly special purpose filters, awkward inlet valves, limited functionality of the outlet spray of the showerhead, and inefficient internal water flow or pressurization. The instant invention addresses these limitations of the prior art.

SUMMARY OF THE INVENTION

The invention relates to a multi-function showerhead filter system disposed within an elongate housing. Therein, the system comprises a ball-like swivel-mounted inlet joint comprising a fluid input to said housing, said inlet joint including a fluid input cavity converging, at the distal end thereof, into a venturi outlet. The system also includes a pressure chamber formed within said housing, downstream of said venturi outlet and in fluid communication therewith, said chamber having an inlet opening at least equal in radius to a largest radius of said venturi outlet. The inventive system also includes a turbulence-inducing water filter cartridge secured within said housing downstream of said pressure chamber and having an inlet surface in fluid and mechanical communication therewith. The system further includes output means within said housing, secured downstream of said filter cartridge and in fluid communication therewith, said output means comprising means for outputting from the showerhead filter system pressurized water which is passed through said filter cartridge, into one or more of the function modes of spraying, bubbling and massaging.

It is accordingly an object of the present invention to provide a cost-effective multi-mode showerhead filter system.

It is another object to provide a showerhead filter system having a compact geometry and a wide range of swivel capability of the showerhead portion versus an inlet joint thereof.

It is a still further object of the invention to provide a showerhead filter system which includes a readily changeable and standardized filter, which includes internal filtration media to effectively disinfect, oxidize or reduce pathogenic microorganisms and toxic compounds which would otherwise be created by the effect of chlorine upon fatty acids, other organics, and carbon fragments within the water supply.

It is a yet further object to provide a system of the above type which enables outputs of one or more of the spray function, a bubbling function, and a massage function therefrom.

It is a still further object to accomplish the objects above set forth without the use of a showerhead filter system having long or complex pads of water flow therein It is a further object to provide a showerhead filter system of the above type which will provide enhanced turbulence and, thereby, increase exposure of the water passing therethrough to the internal filtration media of the filter of the showerhead system.

The above and yet other objects and advantages of the present invention will become apparent from the hereinafter set forth Brief Description of the Drawings, Detailed Description of the Invention and Claims appended herewith.

DETAILED DESCRIPTION OF THE INVENTION

Figure 1:
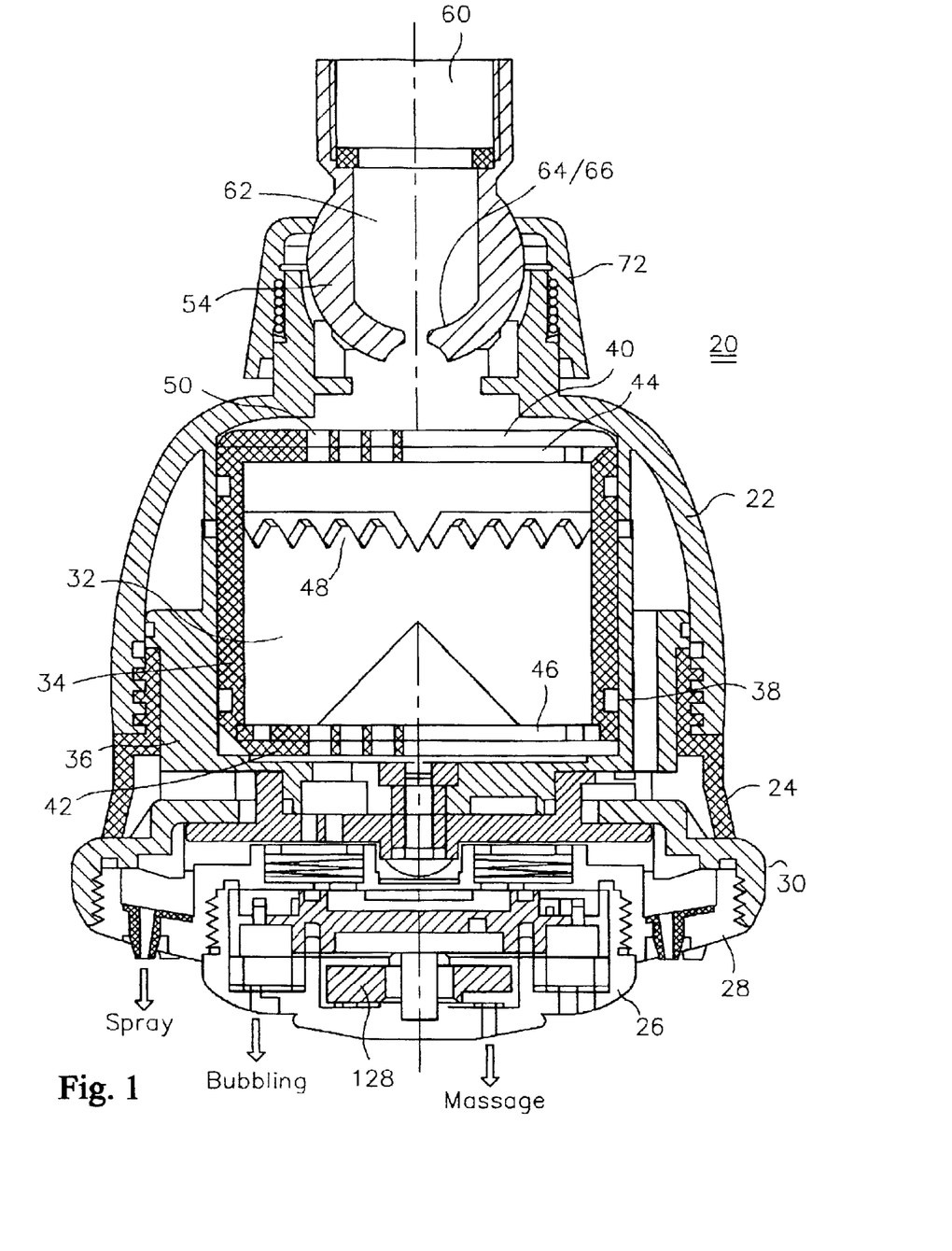
FIG. 1 is a vertical diametric cross-sectional view of the inventive showerhead filter system.

With reference to the vertical diametric cross-sectional view of FIG. 1, the instant inventive multi-function showerhead filter system 20 may be seen to include an upper substantially cylindrical housing 22, an intermediate housing 24 in circumferential threaded relationship with said central housing 22, and a distal-most assembly 26 which is secured to said housing 24 through an annular outer plate 28 and a rotatable annular central assembly 30, the functions and relationships of which are more fully set forth below.

Figure 4:
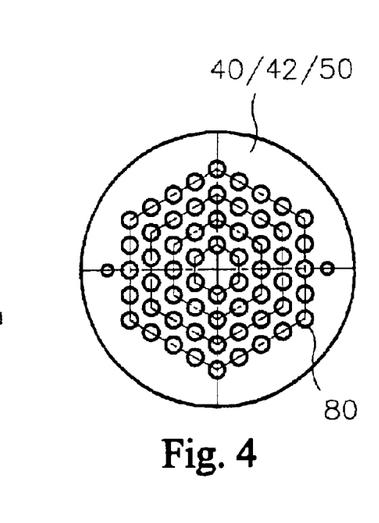
FIG. 4 is a top plan view of the upper cap of the filter cartridge.

With further reference to FIG. 1, there is shown a filter cartridge 32 which is defined by vertical cylindrical walls 34 which, through spacing means 36 and O-rings 38, are secured to said upper housing 22. Filter cartridge 32 further includes upper cap 40 which define the upper and lower surfaces of the filter cartridge. Caps 40/42, the structure of which is generically shown in FIG. 4, cover porous radial disks 44 and 46 therebeneath. Cup 40 and disk 44 define a filter inlet surface, while cup 42 and disk 46 define a filter outlet surface. Within the body of cartridge 32 is a filtration media, such as a KDF media 45 through which the water to be filtered will pass. Further, within filter cartridge 32 is generically shown turbulence inducing means 47. See FIG. 17. However, such means may assume any of a number of forms and positions. See, for example, the turbulence inducing means taught in U.S. Pat. No. 5,975,434 (1999) to Douglas, entitled Showerhead System with Turbulence Inducing and Water Purifying Means, which is incorporated herein by reference. Additionally, a steel of polymeric mesh 49/51 may be interposed between one or more of cup 40./mesh 44 (see FIG. 2) and cup 42/mesh 46 (see FIG. 5) to provide a means for reducing potential media migration out or cartridge 32. A typical value of mesh 49/51 is about 250 to 300.

In terms of the characterizing features of the instant invention, the salient feature of filter cartridge 32 is that it offer a wide inlet surface 50 (see also FIG. 2), such that pressurized water exiting from a venturi outlet 52 of a ball-like swivel mounted inlet joint 54 may be disbursed over a wide area at least as large as inlet opening 56 within upper axial part 22a of said housing 22. There is thereby defined a pressure chamber 58 between the venturi outlet 52 of ball joint 54 and upper surface 50 of upper cap 40.

Figure 2:
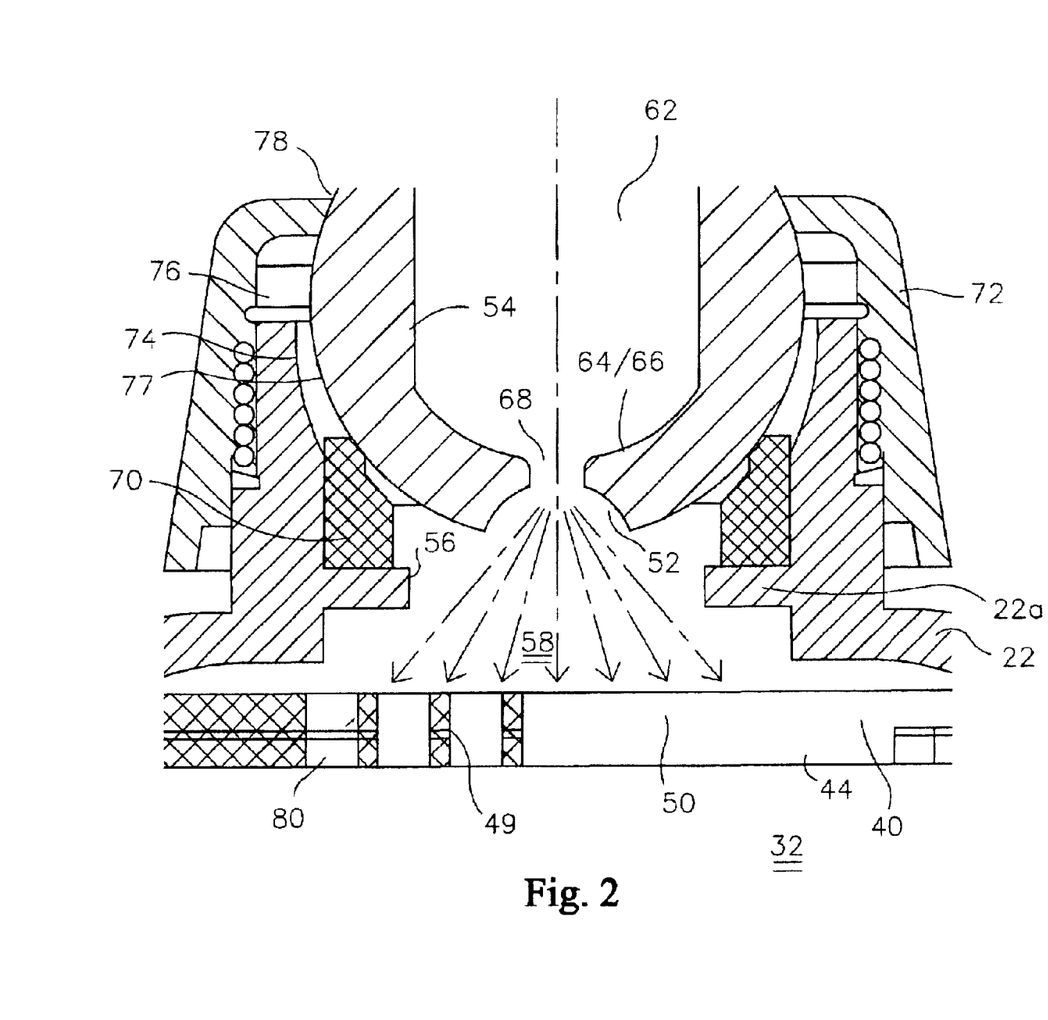
FIG. 2 is an enlarged cross-sectional view of the ball-like swivel mounted inlet joint of the invention, its associated pressure chamber, and the input surface to the water filter cartridge thereof.
Figure 3:
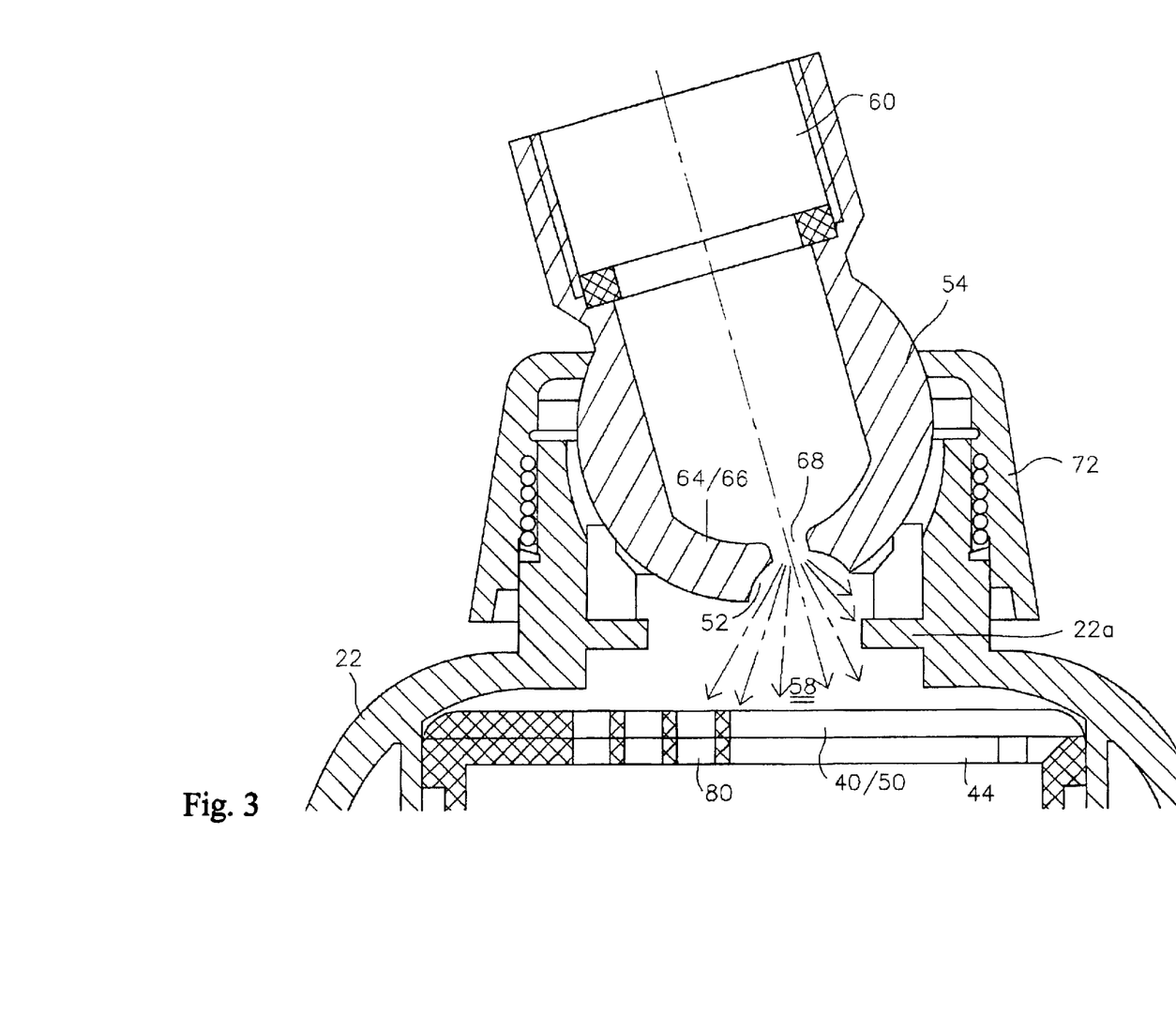
FIG. 3 is a view showing the swivel capability of the inlet joint relative to the system housing.

As may be further noted in the views of FIGS. 1, 2 and 3, inlet joint is substantially hollow to permit a fluid input 60 (typically attached to a water input pipe in a shower area) to fill and pressurize a cavity 62 within joint 54 which, at a distal end 64 thereof, exhibits a curved surface 66 which converges into a channel 68. Thereby, the effect thereof is to considerably increase the pressure of water passing therethrough such that, upon the exit from channel 68, rapid expansion occurs within venturi outlet 52, thereby spreading pressurized water over a large conical region and through said opening 56 within housing 22a within the pressure chamber 58 and to input plate 40 of the filter cartridge 32. The fluid integrity of pressure chamber 58, is assured through the use of washer 70 at a lower interface between ball joint 54 and housing 22a. Suitable travel of inlet joint 54 relative to housing 22 is assured through the mounting of the joint within a circumferential nut-collar 72 as well as the use of curved surfaces 74 in the uppermost portion of housing 22. See FIG. 2. A further washer 76 is provided to yet further ensure the stability of inlet joint 54 as well as its moveability and the fluid integrity of pressure chamber 58. It has, thereby, been discovered that through proper selection of a diameter 78 at the entrance to nut-collar 72 and a proper securement of all outer surfaces 77 of the ball-like inlet joint 54 within said collar 72 and housing 22, a substantial range of motion (see FIG. 3) of the system housing 22 relative to the inlet joint 54 is achieved. The nature of the water flow which is emitted by venturi outlet 52 of the inlet joint to chamber 58 is shown by the series of dotted lines in FIG. 2. The same is further shown in FIG. 3 with reference to the swivel function of the system. It may, accordingly, be appreciated that a venturi outlet in of swivel joint 54 enables a sufficient degree of water pressure to be maintained within pressure chamber 58 against input surface 50 of upper plate 40 regardless of the angle at which the housing 22 is swiveled relative to the inlet joint 54. It is, therein, to be further appreciated that the use of a venturi outlet enables sufficient water pressure to be supplied to pressure chamber 58 even in situations of low water pressure input to system fluid inlet 60, i.e., the narrow channel 58 at the entrance to the venturi outlet 52 provides an increased pressure within pressure chamber 58 and, thereby, to inlet surface 50 of upper plate 40 of the filter cartridge, regardless of low water pressure at inlet 60 of the swivel joint 54.

Figure 5:
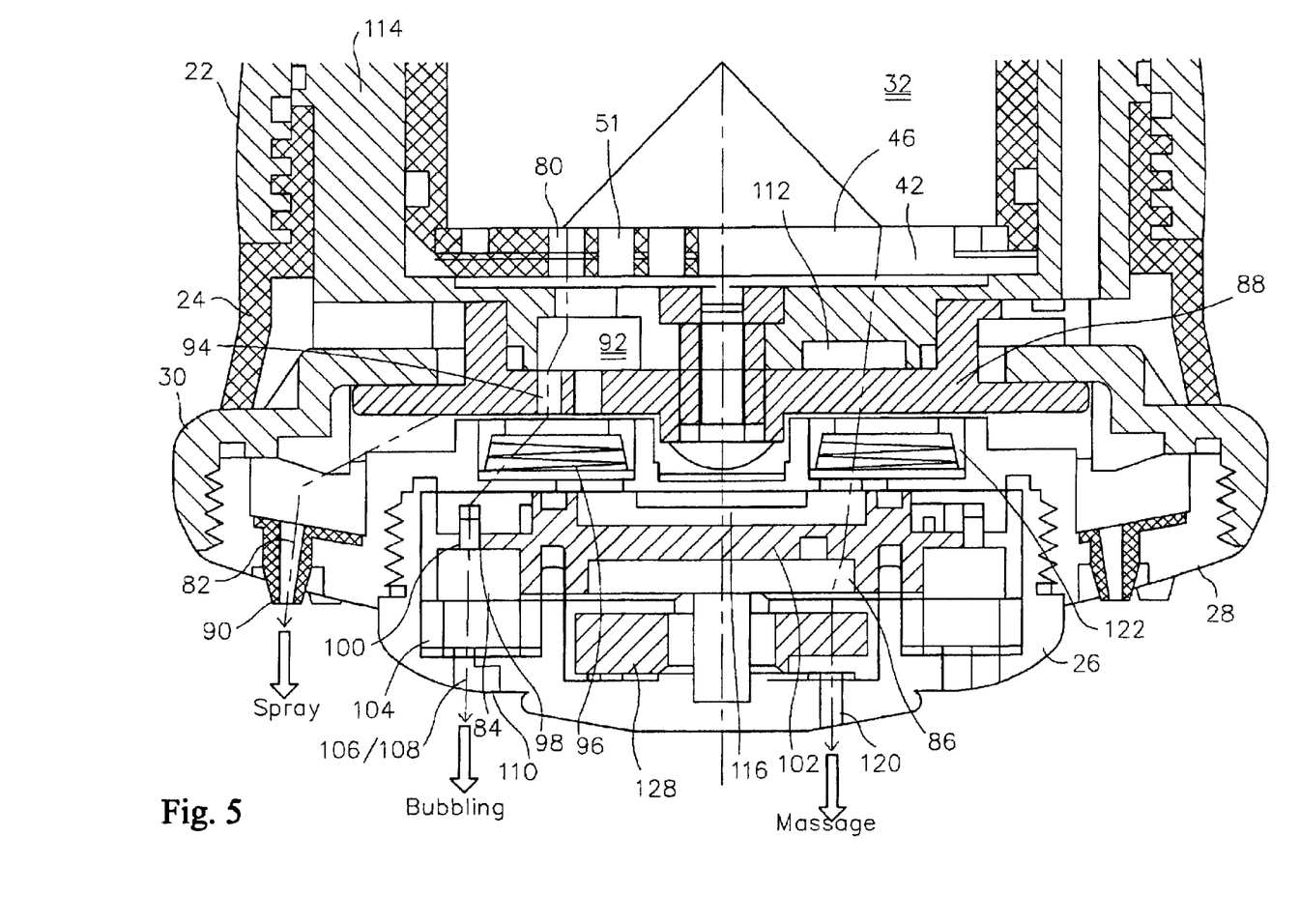
FIG. 5 is an enlarged view of the lower portion of FIG. 1 showing the output related mechanisms of the present system.

With reference to FIG. 5, there is shown the lower portion of the inventive multi-function showerhead filter system. Shown therein is the water path which is followed by a multiplicity of apertures 80 (see FIG. 4) from lower cap 46 of the filter cartridge. More particularly, the radially outermost flow path 82 provides water pressure to the spray function of the apparatus, while flow path 84 furnishes pressure to the bubbling function of the system. Flow path 86 (the pathway closest to the system axis) furnishes fluid pressure to the massage function of the system.

More particularly, there is provided a so-called hold plate 88 (see FIGS. 5, 6 and 9) an important function of which is to divert water pressure to the spray function and its associated outlet channels 90. With respect to said bubbling function, fluid flow path 84 passes through void space 92 (see FIG. 5), through aperture 94 in said hold plate 88 and, therefrom into springs 96 hold within annular assembly 30 (see FIG. 6) and hold plate 88. Therefrom, water stream 44 enters void space 98 of bottom assembly 26 (see FIGS. 5 and 6) and, through apertures 100 of a separator plate 102 (see FIGS. 5, 6 and 12). Therefrom, water flow path 84 proceeds downwardly through bracket 104 and the two types of apertures 106 and 108 (see FIG. 14) therein which, in combination with a reciprocation action of said springs 96, produces a bubbling effect when such a mode of operation is selected by rotation of annular assembly 30 to thereby enable the ultimate water flow pathway 82, 84, or 86 which is selected by the system user. As may be noted, in the bubbling mode, water ultimately exits through apertures 110 of the bottom assembly 26 of the system (see FIGS. 5 and 6).

Figure 6:
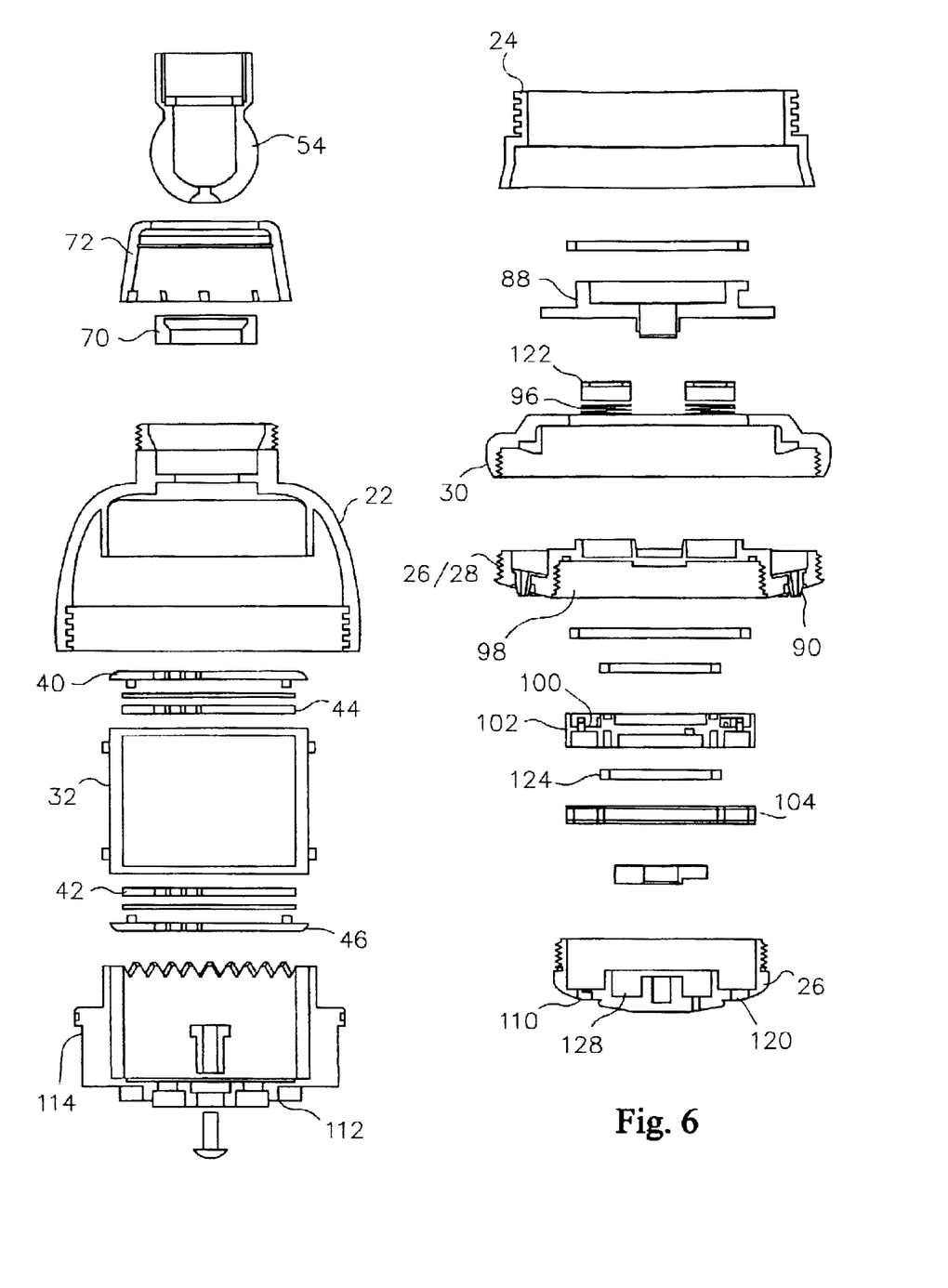
FIG. 6 is an exploded axial view of all components of the inventive system.
Figure 7:
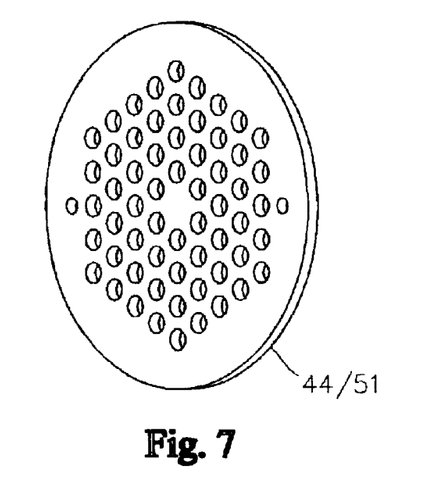
FIG. 7 is a perspective view of the screen mesh underplate of the filter cartridge.
Figure 8:
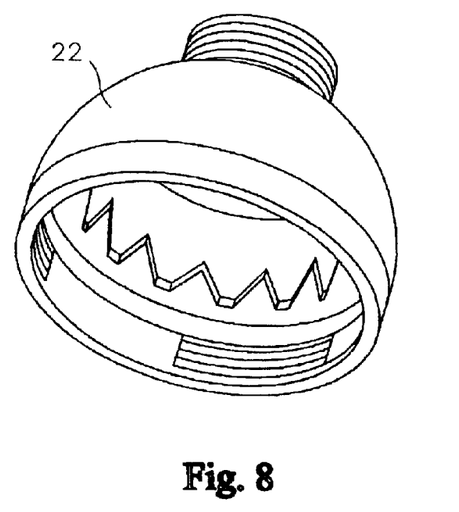
FIG. 8 is a perspective view of the upper portion of the body of the housing of the present system.

With respect to the water path 88 which relates to the massage function of the system, said pathway, after exiting bottom plate 46 of filter 32, enters a void space 112 which is formed between hold plate 88 and a filter stabilizing assembly 114 (see FIGS. 5 and 6). Therefrom, flow path 86 proceeds through said plate 88, through said springs 96, through a void space 116 (see FIG. 5) and through apertures 118 within separator plate 102 (see FIGS. 6 and 12). Therefrom, water path 86, associated with the massage function, will proceed through bottom housing piece 26 and will ultimately exit the system through apertures 120 (see FIGS. 5 and 6).

Figures 9, 10:
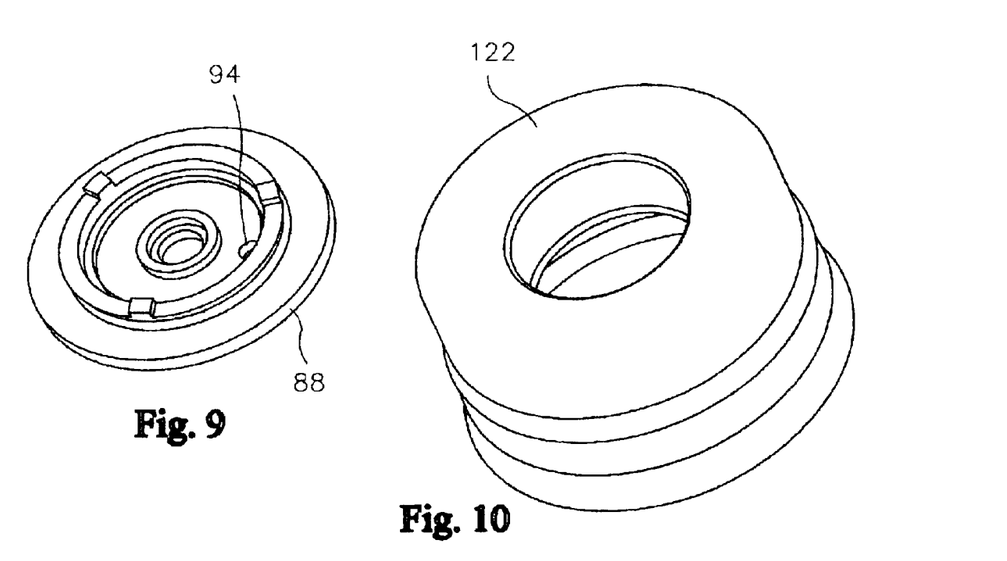
FIG. 9 is a perspective view of a spring holding plate associated with the massage and bubbling functions.
FIG. 10 is a perspective view of a washer which isolates the bubbling from the massage functions of the invention.

Shown in FIG. 10 is the geometry of spring washer 122 which assures the stabilization of springs 96 relative to rotational element 30 (see also FIGS. 5 and 6).

Figure 11A:
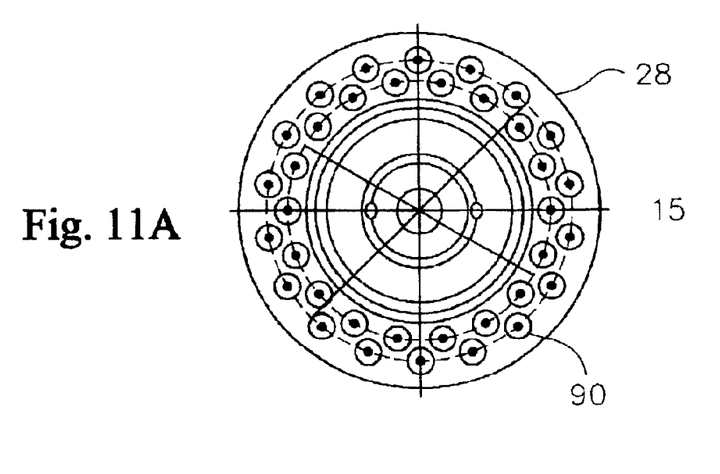
FIGS. 11A thru 11C are respective top, perspective and bottom views of an outer plate means associated with the spraying, bubbling and massage functions.
Figure 11B:
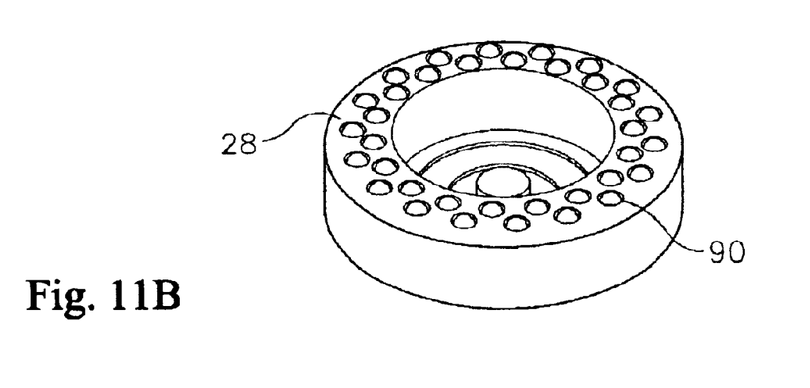
Figure 11C:
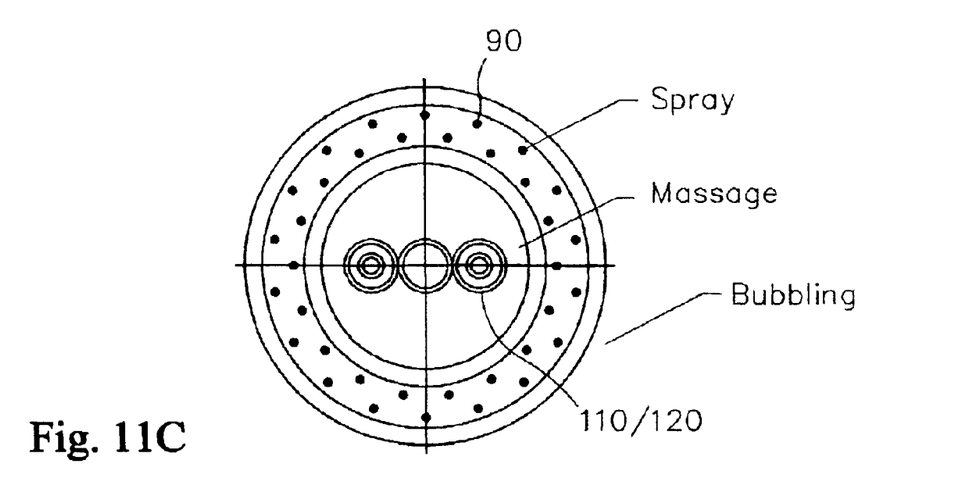

In FIGS. 11a, 11b and 11c are shown in respective top, bottom and bottom perspective views, the fine structure of outer plate 28 which is controlled by said rotating annular assembly 30. See also FIGS. 5 and 6. Therein may be seen spray apertures 90, and bubbling and massage apertures 110/120. That is, depending upon the nature of the rotation of assembly 30, apertures of the plate 28 will align with the desired fluid path 84 or 86.

Figure 12:
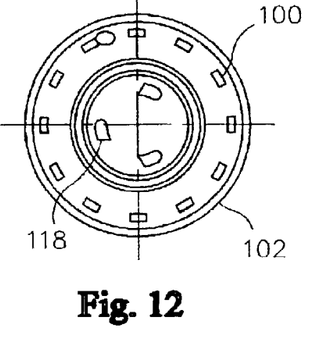
FIG. 12 is a separator plate which isolates the spray function from the other functions of the output of the system.

In FIG. 12 is shown said separator plate 102 which isolates the spray function from the bubbling and massage functions of the system.

Figure 13:
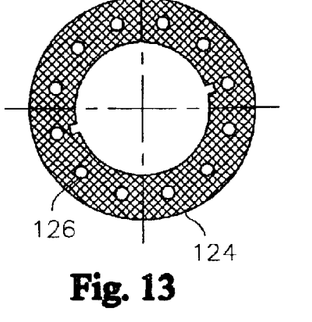
FIG. 13 is a filter associated with the spray function.

FIG. 13 shows a filter bracket 124 and its associated apertures 126, the function of which is to stabilize filter 104 described above (see also FIG. 6).

Figures 14, 15, 16, 17:
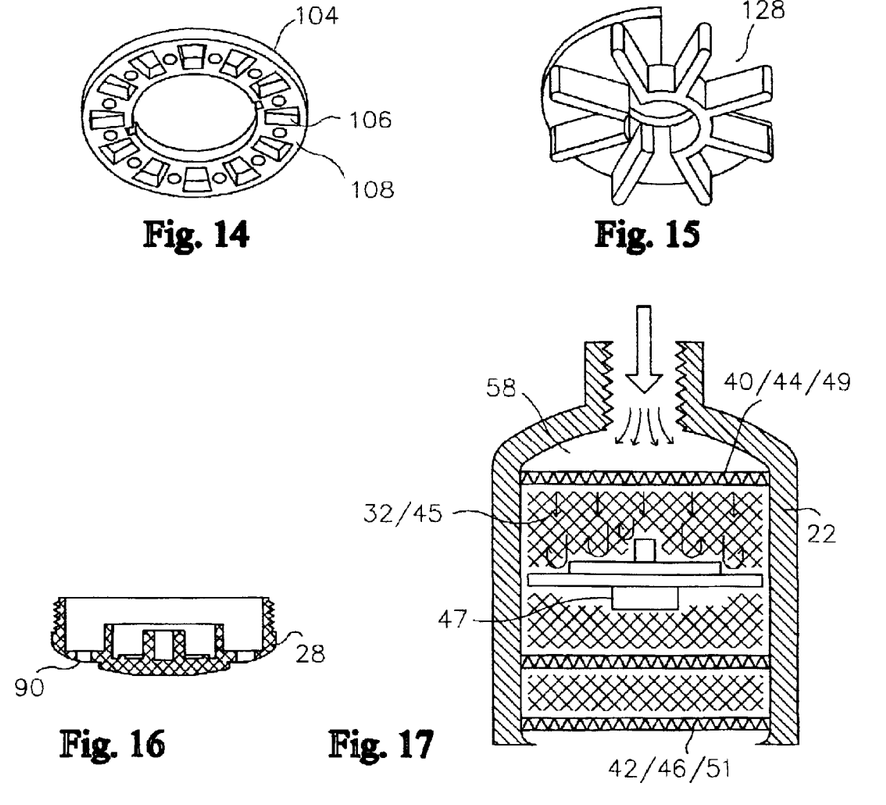
FIG. 14 is a bracket associated with the bubbling function of the system.
FIG. 15 is a perspective view of the impeller associated with the massage function.
FIG. 16 is a diametric cross-sectional view of the distal most portion of the showerhead filter system.
FIG. 17 is a schematic axial cross-sectional view of the turbulence inducing means of the filter cartridge.

FIGS. 6 and 14 show said bracket 104 associated with the bubbling function of the system.

In FIG. 15 is shown impeller 128 which enable the massage function of the present system (see also FIGS. 1, 5 and 6)

In FIG. 16 is shown said distal most assembly 26 which defines the bottom of the structure.

There is thus provided a showerhead filter system which includes a readily changeable and standardized filter, which includes internal filtration media to effectively disinfect, oxidize or reduce pathogenic microorganisms and toxic compounds which would otherwise be created by the effect of chlorine upon fatty acids, other organics, and carbon fragments within the water supply.

Also provided is a system of the above type which enables outputs of one or more of the spray function, a bubbling function, and a massage function therefrom.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

Having thus described our invention what we claim as new, useful and non-obvious and, accordingly, secure by Letters Patent of the United States is:

1. A multi-function showerhead filter system disposed within an elongate housing, the system comprising:
   (a) a ball-like swivel-mounted inlet joint comprising a fluid input to said housing, said ball like inlet joint including a fluid input cavity converging, at a distal end thereof, into a venturi outlet;
   (b) a pressure chamber formed within said housing, downstream of said venturi outlet and in fluid communication therewith, said chamber having an inlet opening at least equal in radius to a largest radius of said venturi outlet of said swivel-mounted joint;
   (c) a turbulence-inducing water filter cartridge secured within said housing downstream of said pressure chamber and having an inlet surface in fluid communication therewith and having an outlet surface
   (d) fluid configuration means, disposed within said housing, and secured downstream of said filter cartridge in fluid communication with said outlet surface, said fluid means comprising means for providing a pressurized water output from said housing in selectably one or more of the functions of spraying, bubbling and massaging.

2. The system as recited in claim 1, in which said venturi outlet defines an axial channel enlarging into a flared output in fluid communication with said pressure chamber.

3. The system as recited in claim 2, in which a surface of said fluid input of said cavity are curved.

4. The system as recited in claim 3, in which said inlet joint is secured to said housing by an upper collar thereof within which said joint may swivel.

5. The system as recited in claim 2, in which at least one of said inlet and outlet surfaces of said filter-cartridge includes a radial disk for reducing potential media migration out of said cartridge.

6. The system as recited in claim 5, in which at least one of said inlet and outlet surfaces of said filter-cartridge includes a radial disk for reducing potential media migration out of said cartridge.

* * * * *